United States Patent
Kim (10) Patent No.: US 11,009,903 B1
(45) Date of Patent: May 18, 2021

(54) FOLDABLE BRAKE PEDAL APPARATUS FOR AUTONOMOUS VEHICLE

(71) Applicants: Hyundai Motor Company, Seoul (KR); Kia Motors Corporation, Seoul (KR)

(72) Inventor: Eun Sik Kim, Gwangmyeong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/892,147

(22) Filed: Jun. 3, 2020

(30) Foreign Application Priority Data

Feb. 12, 2020 (KR) .................. 10-2020-0016926

(51) Int. Cl.
| G05G 1/44 | (2008.04) |
| B60T 7/06 | (2006.01) |
| G05G 1/46 | (2008.04) |
| B60T 7/04 | (2006.01) |
| G05G 1/38 | (2008.04) |

(52) U.S. Cl.
CPC .............. G05G 1/44 (2013.01); B60T 7/042 (2013.01); B60T 7/06 (2013.01); G05G 1/38 (2013.01); G05G 1/46 (2013.01); B60T 2220/04 (2013.01); B60Y 2400/301 (2013.01); G05G 2505/00 (2013.01)

(58) Field of Classification Search
CPC ............ G05G 1/44; G05G 1/445; G05G 1/40; G05G 2505/00; B60T 7/06
See application file for complete search history.

(56) References Cited

U.S. PATENT DOCUMENTS

| 6,516,683 | B2 * | 2/2003 | Sundaresan | B60T 7/06 74/560 |
| 6,584,871 | B2 * | 7/2003 | Burton | G05G 1/405 74/512 |
| 6,609,438 | B1 * | 8/2003 | Bigham | G05G 1/30 74/512 |
| 6,662,677 | B2 * | 12/2003 | Rixon | B60T 7/06 74/512 |
| 6,739,212 | B2 * | 5/2004 | Flynn | B60K 26/02 74/512 |
| 6,952,980 | B2 * | 10/2005 | Hayashihara | G05G 1/405 74/512 |
| 7,424,836 | B2 * | 9/2008 | Takai | G05G 1/405 74/512 |
| 9,283,934 | B2 * | 3/2016 | Shand | G05G 5/03 |

FOREIGN PATENT DOCUMENTS

KR 10-2017-0137427 A 12/2017

* cited by examiner

*Primary Examiner* — Patrick Cicchino
(74) *Attorney, Agent, or Firm* — Morgan, Lewis & Bockius LLP (57) ABSTRACT

A brake pedal apparatus of an autonomous vehicle may include a brake pedal, wherein a lower end portion of a brake pedal is popped-up to be exposed to the interior of the vehicle so that a driver may operate the brake pedal in a manual driving mode situation for the driver to directly drive the vehicle, and the brake pedal is in a hidden state so that the driver may not operate the brake pedal as the lower end portion of the brake pedal is rotated to move forward by operation of an actuator in an autonomous running mode situation in which the driver does not drive directly the vehicle.

18 Claims, 10 Drawing Sheets

FOLDABLE BRAKE PEDAL APPARATUS FOR AUTONOMOUS VEHICLE

CROSS REFERENCE TO RELATED APPLICATION

The present application claims priority to Korean Patent Application No. 10-2020-0016926 filed on Feb. 12, 2020, the entire contents of which is incorporated herein for all purposes by this reference.

BACKGROUND OF THE INVENTION

Field of the Invention

The present invention relates to a foldable brake pedal apparatus of an autonomous vehicle, and more particularly, to a foldable brake pedal apparatus of an autonomous vehicle, which exposes a brake pedal to the interior of a vehicle so that a driver may operate the brake pedal in a manual driving mode situation for the driver to directly operate the vehicle, and blocks the exposure of the brake pedal to the interior of the vehicle so that the driver may not operate the brake pedal in the autonomous running situation.

Description of Related Art

An autonomous vehicle is a smart vehicle which is added with an autonomous running technology in which a vehicle autonomously finds a destination even though a driver directly operates a steering wheel, an accelerator pedal, a brake, or the like, and is rapidly being developed.

When the autonomous running situation is universally realized, the manual driving mode in which the driver directly drives a vehicle, and the autonomous running mode in which the driver does not directly drive a vehicle but the vehicle autonomously runs to the destination may be selected.

In the autonomous running mode, the driver needs to be able to rest comfortably with his or her feet stretched. Thus, there is a drawback in that pedals (acceleration pedal, brake pedal) positioned in a space below a driver seat with being exposed to the interior of the vehicle as it may disturb the driver's rest.

Furthermore, the autonomous running situation is a situation in which the driver does not operate the pedals (acceleration pedal, brake pedal) of the vehicle, and when the driver operates the pedal during autonomous running, a vehicle controller is configured to determine that the driver terminates the autonomous running and wants to drive the vehicle directly, and terminates the control for the autonomous running.

However, since the pedal of the vehicle is configured to be exposed to the space below the driver seat, there is a concern that the driver may unconsciously operate the pedal in the autonomous running situation (erroneous operation of the pedal), and in the instant case, there is a concern that the accident will occur according to the roadway situation, the inter-vehicle distance, or the like.

Accordingly, it is necessary to develop a new technology of the pedal apparatus which exposes the pedal to the interior of the vehicle so that the driver may operate the pedal in the manual driving mode in which the driver drives the vehicle directly, and blocks the exposure of the pedal to the interior of the vehicle so that the driver may not operate the pedal for the safety, such as the comfortable rest and prevention of the erroneous operation of the driver, in the autonomous running situation.

The foregoing explained as the background is intended merely to aid in the understanding of the background of the present invention, and is not intended to mean that the present invention falls within the purview of the related art which is already known to those skilled in the art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a foldable brake pedal apparatus of an autonomous vehicle, which exposes a brake pedal to the interior of the vehicle so that a driver may operate the brake pedal in a manual driving mode situation for a driver to directly operate the vehicle, and blocks the exposure of the brake pedal to the interior of the vehicle so that the driver may not operate the brake pedal in the autonomous running mode situation for the driver not to directly operate the vehicle, to enable the comfortable rest of the driver in the autonomous running situation, and to block the erroneous operation of the brake pedal in the autonomous running situation, improving the safety.

A foldable brake pedal apparatus of an autonomous vehicle according to an exemplary embodiment of the present invention for achieving the object includes: a pedal member which is mounted below a driver seat and has guide grooves formed on the left and right side surfaces thereof; a pedal shaft which is mounted to penetrate the left and right side surfaces of the pedal member through the guide grooves and configured to move along the guide grooves; a brake pedal wherein an upper end portion of the brake pedal is rotatably coupled to the pedal shaft and has the lower portion of the pedal shaft connected to a brake booster with a pedal push rod; an actuator which is fixed to the pedal member; and a connection mechanism which connects the actuator with the pedal shaft to deliver the power of the actuator to the pedal shaft so that the pedal shaft moves along the guide grooves when the actuator is operated.

The guide grooves are formed to be cut in arc shapes along the rotation radius around a connection point in which the brake pedal and the pedal push rod are coupled, has the front end portion blocked by the pedal member, and has the rear end portion formed to be open downwardly from the pedal member.

The pedal shaft and the brake pedal are integrally coupled to each other and the pedal shaft rotates within the guide grooves when the brake pedal is operated; the brake pedal rotates forward with respect to the pedal member by the rotation of the pedal shaft; and the brake booster is operated by a forward movement of the pedal push rod when the brake pedal rotates forward therefrom.

The guide grooves are formed to be cut in arc shapes along the rotation radius around the connection point between the brake pedal and the pedal push rod; the pedal shaft is configured to be slidably moved along the guide grooves by receiving the operating force of the actuator through the connection mechanism; the brake pedal is in a hidden state where the brake pedal is blocked from being exposed to the interior of the vehicle as the brake pedal rotates around the connection point such that the lower end portion of the brake pedal rotates to move forward, when the pedal shaft slides from positions of the front end portions of the guide grooves toward the rear end portions thereof; and the brake pedal is in a pop-up state where the brake pedal is exposed to the interior of the vehicle as the brake pedal rotates around the connection point and the lower end portion of the brake pedal rotates to move backward, when the pedal shaft slides from positions of the rear end portions of the guide grooves toward the front end portions thereof.

The foldable brake pedal apparatus of an autonomous vehicle further includes a return spring which is mounted to connect the pedal member with the brake pedal, accumulates an elastic force while being increased in length thereof when the brake pedal rotates forward as the driver operates the brake pedal by depressing the brake pedal with his or her foot, and returns by rotating the brake pedal backward by the accumulated elastic force when the driver releases the brake pedal from his or her foot.

The foldable brake pedal apparatus of an autonomous vehicle may further include a permanent magnet which is fixedly coupled to one end surface of the pedal shaft; and a contactless pedal sensor which is fixed to the pedal member, and the contactless pedal sensor detects a rotation angle of the brake pedal through a change in a magnetic field strength of the permanent magnet according to a change in a rotation position of the permanent magnet, only when the pedal shaft rotates in a state where the permanent magnet surfaces the contactless pedal sensor, and generates a signal related to braking.

The guide grooves are formed to be cut in arc shapes along the rotation radius around the connection point between the brake pedal and the pedal push rod; the permanent magnet which is coupled to the pedal shaft faces the contactless pedal sensor only in a state where the pedal shaft is positioned at the front end portions of the guide grooves; and the contactless pedal sensor generates the signal related to the braking when the brake pedal rotates in the state where the permanent magnet and the contactless pedal sensor face each other.

The guide grooves are formed to be cut in arc shapes along the rotation radius around the connection point between the brake pedal and the pedal push rod; the permanent magnet coupled to the pedal shaft finishes facing the contactless pedal sensor, when the pedal shaft slides from positions of the front end portions of the guide grooves toward the rear end portions thereof by the operation of the actuator; and the contactless pedal sensor generates no signal related to braking to prevent an erroneous operation of the brake pedal, when the brake pedal rotates in the state where the permanent magnet and the contactless pedal sensor finish facing each other.

The actuator includes a motor and a motor shaft which is coupled to the motor and has a thread formed on an external circumferential surface of the motor shaft; the connection mechanism includes: a pipe nut which has a thread formed on an internal circumferential surface of the pipe nut to be screw-coupled to the motor shaft while the motor shaft is provided to penetrate the pipe nut; a band bracket which is formed so that a "U"-shaped groove portion, which is coupled integrally to the pipe nut and surrounds the pedal shaft penetrating the "U"-shaped groove portion in the left and right direction thereof, is positioned below the pipe nut; and a support pin which is fixed to a rear surface of the pedal member and is mounted to penetrate the band bracket; and the pipe nut moves linearly in a longitudinal direction of the motor shaft when the motor shaft rotates, and simultaneously, the band bracket moves linearly in a longitudinal direction of the support pin.

Two "U"-shaped groove portions of the band bracket are formed to be spaced from each other in the left and right direction thereof; and the pedal shaft is mounted to simultaneously penetrate the two guide grooves and the two "U"-shaped groove portions which are formed on the left and right side surfaces of the pedal member, respectively, such that the pedal shaft is supported by the two guide grooves and the two "U"-shaped groove portions to be prevented from a distortion thereof in a longitudinal direction of the pedal shaft.

The guide grooves are formed to be cut in arc shapes along the rotation radius around the connection point between the brake pedal and the pedal push rod and the front end portions thereof are formed of the structure blocked by the pedal member; and when the pedal shaft is positioned at the front end portions of the guide grooves, the pedal shaft supported by the "U"-shaped groove portions to be prevented from bending forward, and simultaneously, is supported by the guide grooves to be prevented from bending forward and upward.

In a brake pedal apparatus of an autonomous vehicle according to an exemplary embodiment of the present invention, guide grooves having arc shapes which are cut to extend along a longitudinal direction of the pedal member are formed on both side surfaces of a pedal member; a pedal shaft, which is provided to penetrate the guide grooves, is coupled to an upper end portion of a brake pedal; when the pedal shaft is positioned at the front end portions of the guide grooves, the brake pedal rotates around a connection point, which connects a brake booster with the brake pedal, such that the lower end portion of the brake pedal is popped-up to be exposed to the interior of the vehicle where a driver exists; and when the pedal shaft moves from the front end portions of the guide grooves toward the rear end portions thereof, the brake pedal rotates around the connection point and the lower end portion of the brake pedal moves forward, such that the lower end portion of the brake pedal is in a hidden state where the brake pedal is not exposed to the interior of the vehicle.

The brake pedal apparatus of an autonomous vehicle according to an exemplary embodiment of the present invention has a configuration in which the lower end portion of the brake pedal is popped-up to be exposed to the interior of the vehicle so that the driver may operate the brake pedal in the manual driving mode situation in which the driver drives the vehicle directly, and the brake pedal becomes the hidden state so that the driver may not operate the brake pedal as the lower end portion of the brake pedal is rotated to move forward by the operation of the actuator in the autonomous running mode situation in which the driver does not drive the vehicle directly, and enables the comfortable rest of the driver in the autonomous running situation, and blocks the erroneous operation of the brake pedal in the autonomous running situation, improving the safety.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a brake pedal apparatus of an autonomous vehicle according to exemplary embodiments of the present invention will be described with reference to the accompanying drawings.

As illustrated in FIGS. 1 to 11, the brake pedal apparatus of an autonomous vehicle according to an exemplary embodiment of the present invention includes a pedal member 10 which is fixed in a space below a driver seat and has guide grooves 12 formed on the left and right side surfaces 11 thereof; a pedal shaft 20 which is mounted to penetrate the left and right side surfaces 11 of the pedal member 10 through the guide grooves 12 and to move along the guide grooves 12; a brake pedal 50 which is coupled to the pedal shaft 20 by inserting an upper end portion of the pedal shaft 20 into the pedal member 10 and has the lower portion of the pedal shaft 20 connected to a brake booster 40 with a pedal push rod 30; an actuator 60 which is fixed to the pedal member 10; and a connection mechanism 70 which connects the actuator 60 with the pedal shaft 20 to deliver the power of the actuator 60 to the pedal shaft 20 so that the pedal shaft 20 moves along the guide grooves 12 when the actuator 60 is operated.

The pedal member 10 has the schematic exterior formed in a square box shape, the empty interior opened to the lower side thereof, the front surface fixed to a dash panel configuring a vehicle body, and the upper surface coupled to a cowl bracket 80, and the cowl bracket 80 is coupled to a cowl panel.

The guide grooves 12 are formed to penetrate the left side surface 11 and the right side surface 11 of the pedal member 10 in the same shapes, and are formed in arc shapes which are cut to extend in the front and rear direction along the rotation radius around a connection point (P1) between the brake pedal 50 and the pedal push rod 30, and the front end portions of the guide grooves 12 are formed of a structure blocked by the pedal member 10, and the rear end portions thereof are formed to be open downwardly from the pedal member 10.

The pedal shaft 20 is integrally coupled to the upper end portion of the brake pedal 50 through welding, the pedal shaft 20 which is coupled to the upper end portion of the brake pedal 50 is mounted to penetrate the guide grooves 12 which are formed on the left and right side surfaces 11 of the pedal member 10, and accordingly, the upper end portion of the brake pedal 50 to which the pedal shaft 20 is coupled is configured to be inserted into the pedal member 10 through the open lower portion of the pedal member 10.

Accordingly, when the driver operates the brake pedal by depressing the brake pedal 50 with his or her foot, the pedal shaft 20 rotates (axially rotates) within the guide slot 12, the brake pedal 50 is rotated, by the rotation of the pedal shaft 20, forward with respect to the pedal member 10, and the brake booster 40 is operated by a forward movement of the pedal push rod 30, when the brake pedal 50 rotates forward, to generate the hydraulic pressure required for braking.

Furthermore, according to an exemplary embodiment of the present invention has a configuration which further includes a return spring 90 which is mounted to connect the pedal member 10 with the brake pedal 50, and the return spring 90 is configured to accumulate an elastic force while being increased in length thereof when the brake pedal 50 rotates forward as the driver operates the brake pedal by depressing the brake pedal 50 with his or her foot, and to return to the initial position by rotating the brake pedal 50 backward by the accumulated elastic force when the driver releases the foot from the brake pedal 50.

The return spring 90 is preferably a compression coil spring, but is not limited thereto.

The actuator 60 is fixed to the internal side surface of the pedal member 10 via a plurality of fastening members 100 (bolts or screws) with being inserted into the pedal member 10, and the connection mechanism 70 is configured to connect the actuator 60 with the pedal shaft 20, such that the operating force of the actuator 60 is delivered to the pedal shaft 20 through the connection mechanism 70, and the pedal shaft 20 slides along the guide grooves 12 when the actuator 60 is operated.

Figure 1:
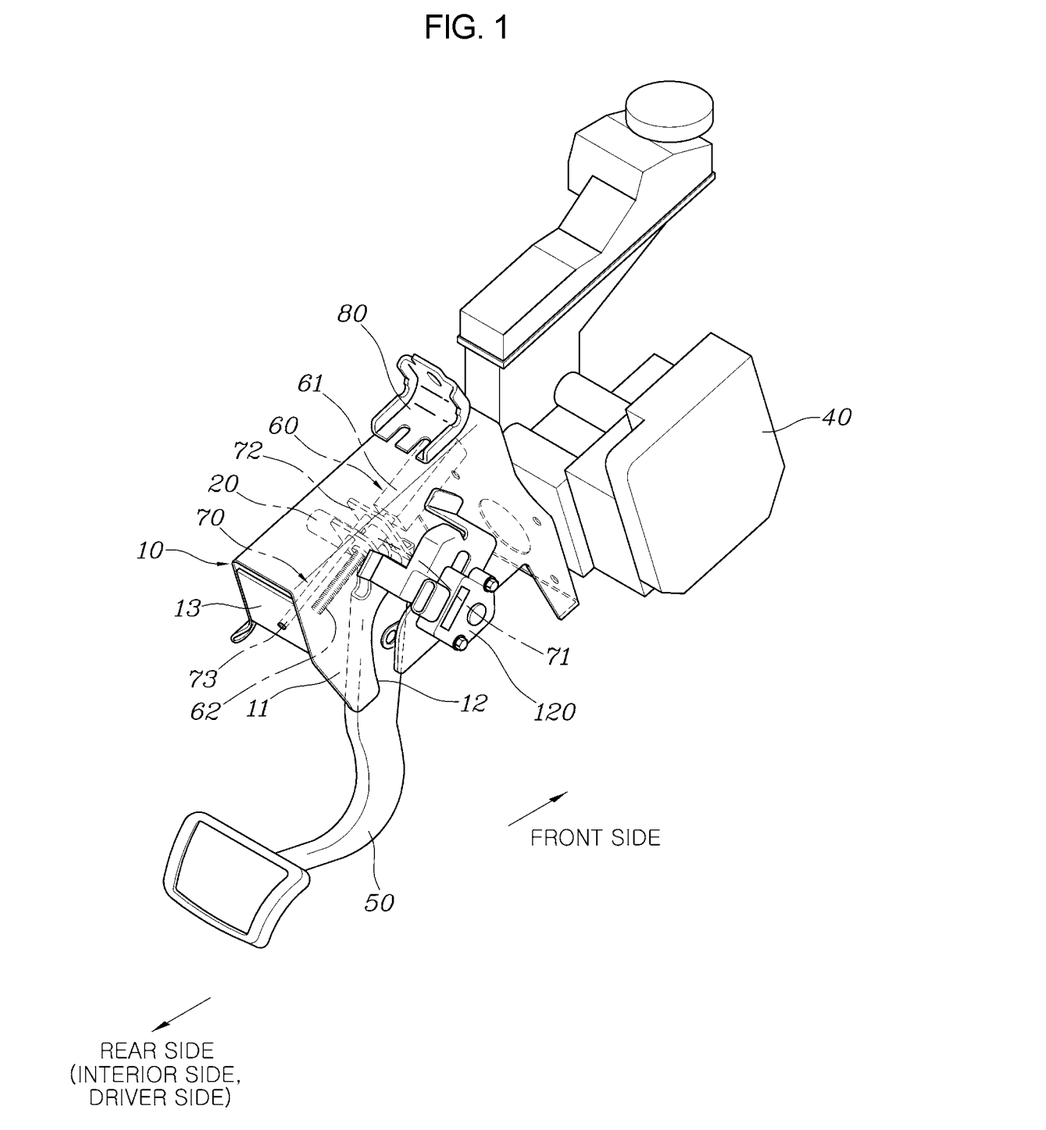
FIG. 1, FIG. 2, and FIG. 3 are a perspective diagram, a front diagram, and a side diagram of a brake pedal apparatus of an autonomous vehicle according to an exemplary embodiment of the present invention.
Figure 2:
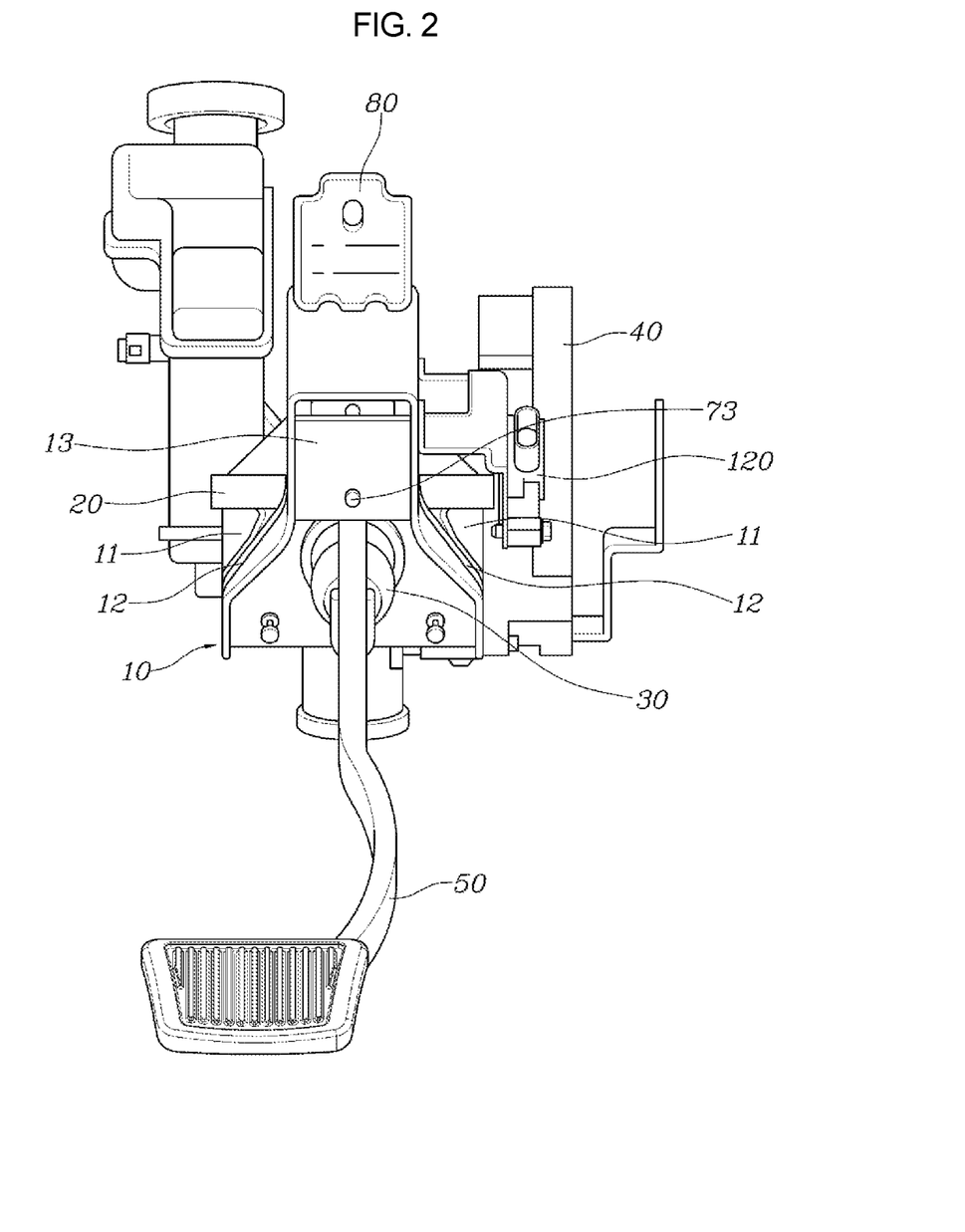
Figure 3:
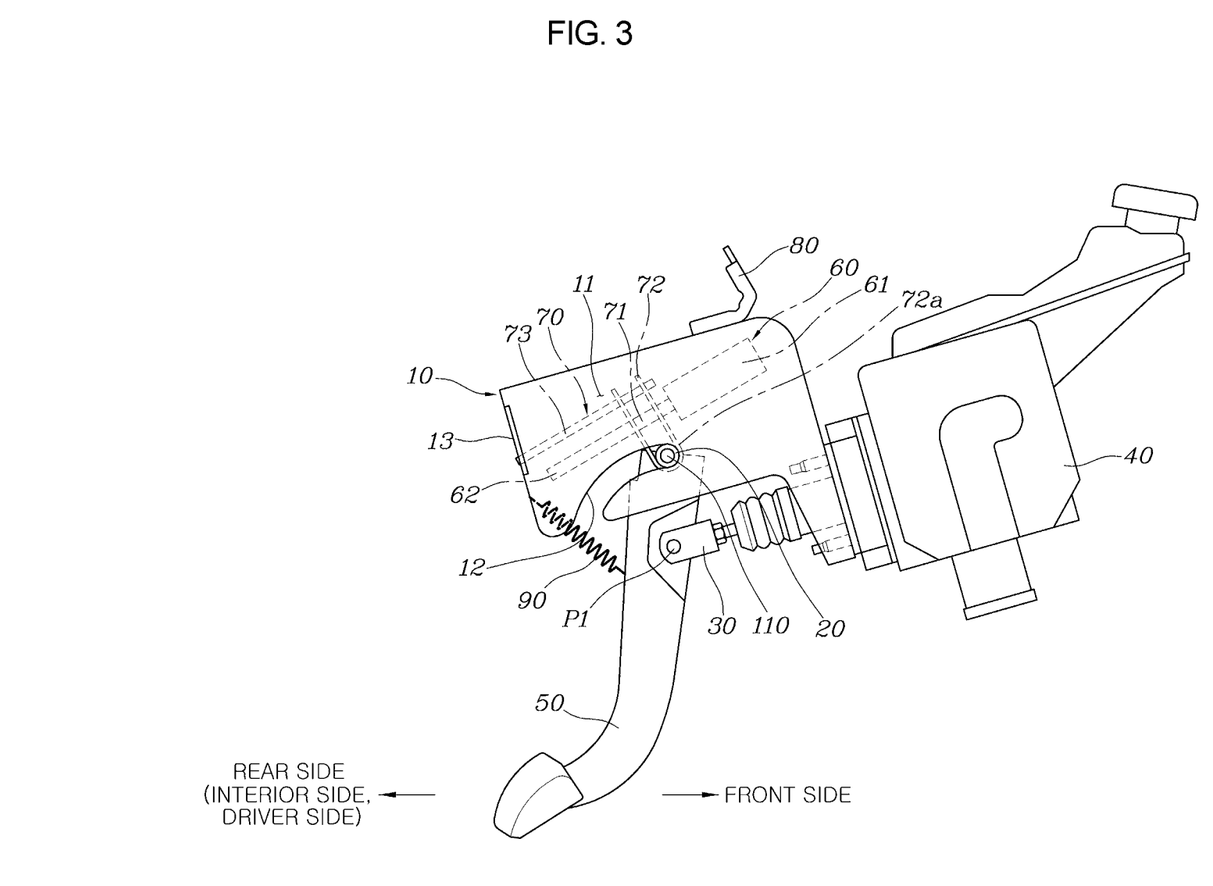
Figure 4:
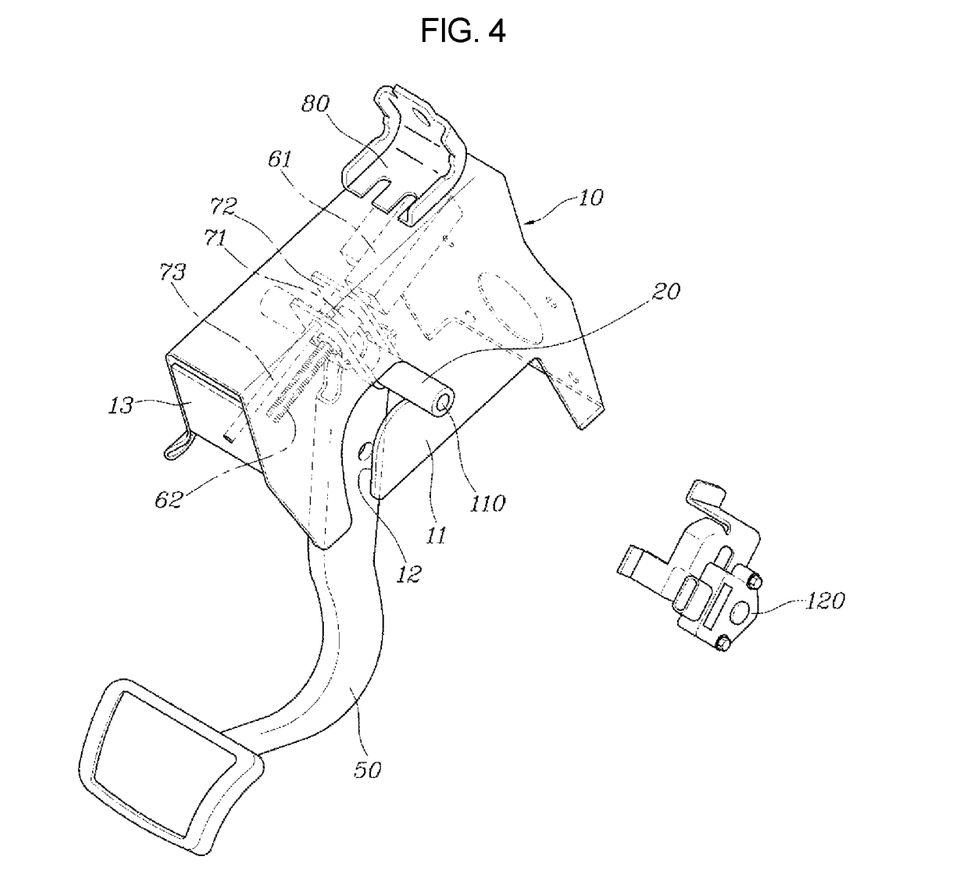
FIG. 4 is a perspective diagram in which a contactless pedal sensor is separated from a pedal member illustrated in FIG. 1.
Figure 5:
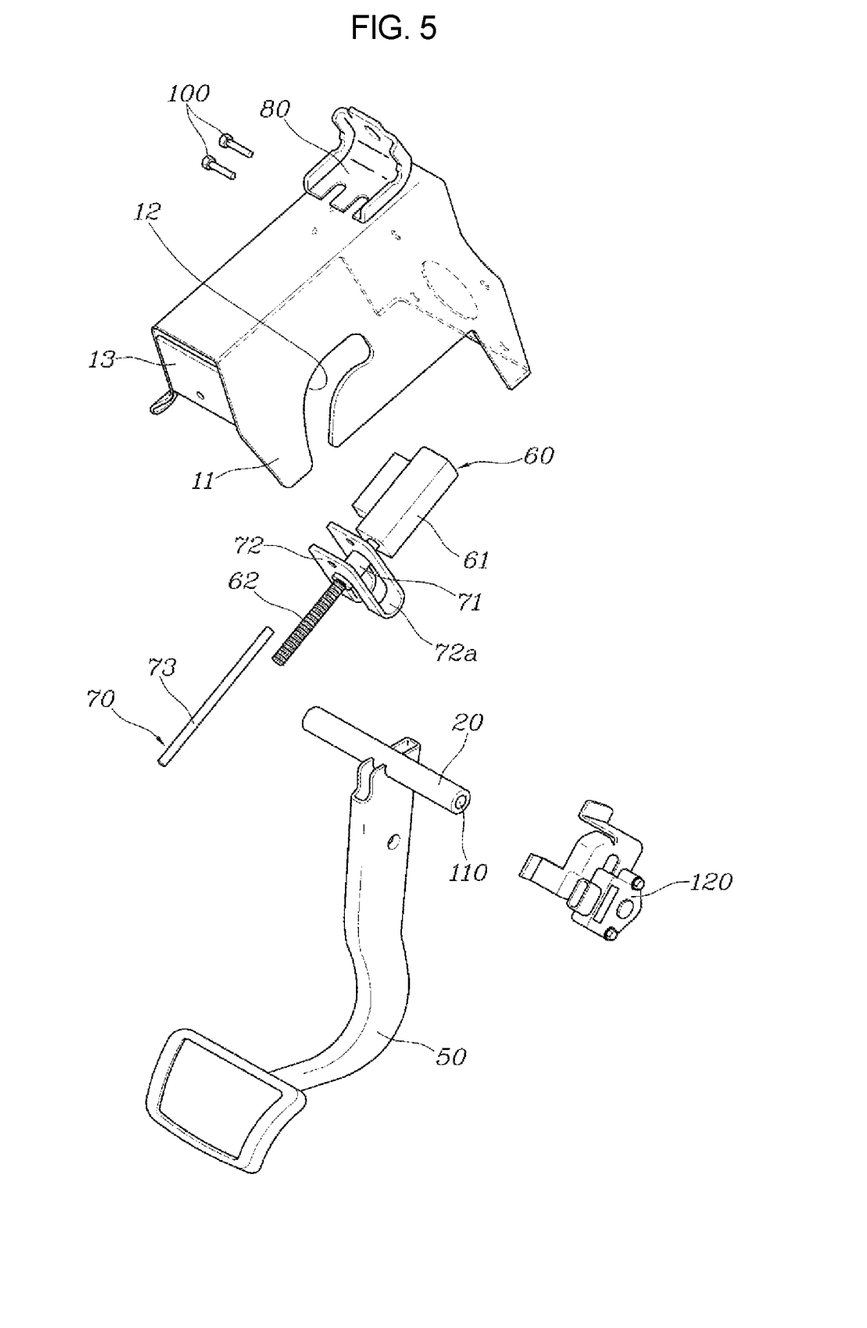
FIG. 5 is an exploded perspective diagram of the brake pedal apparatus of an autonomous vehicle according to an exemplary embodiment of the present invention.
Figure 6:
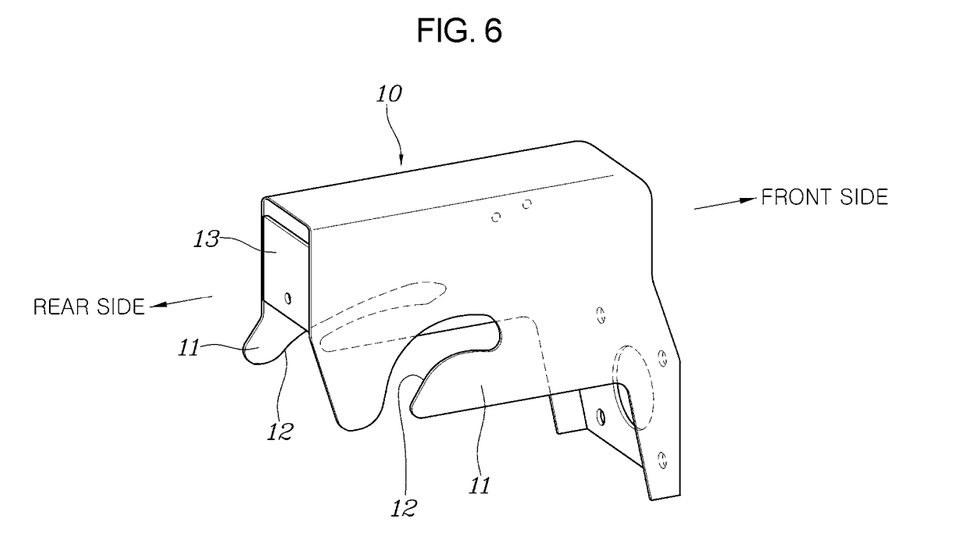
FIG. 6 and FIG. 7 are a perspective diagram and a plan diagram of the pedal member according to an exemplary embodiment of the present invention.
Figure 7:
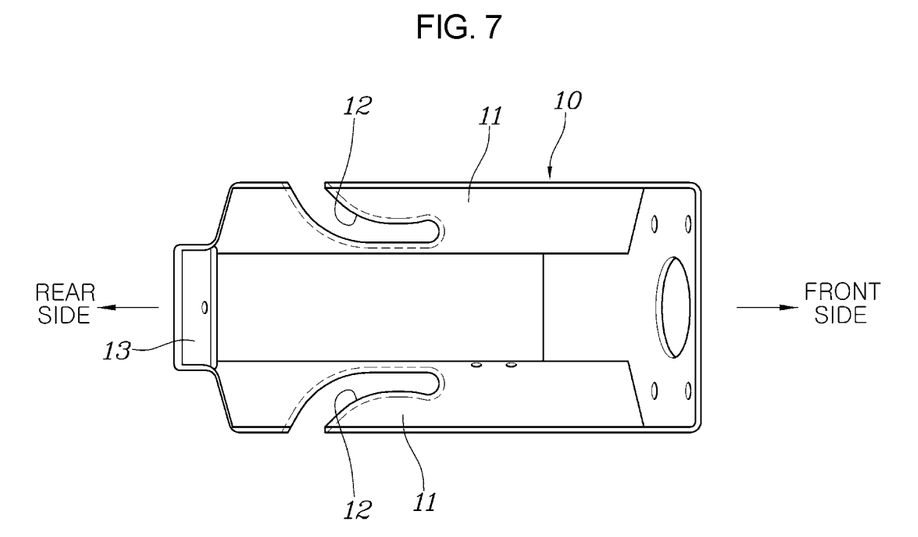
Figure 8:
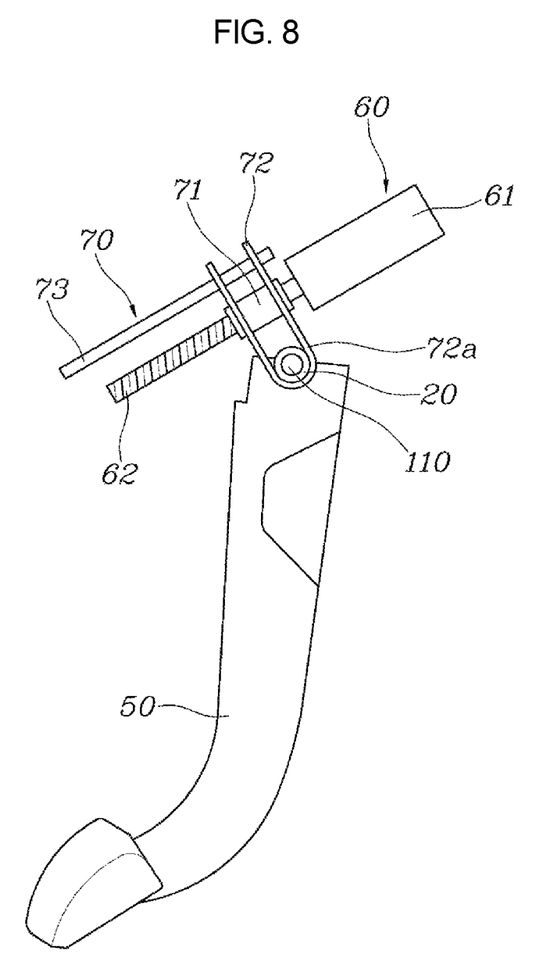
FIG. 8 is a diagram illustrating a state of removing the pedal member and a brake booster from FIG. 3.
Figure 9:
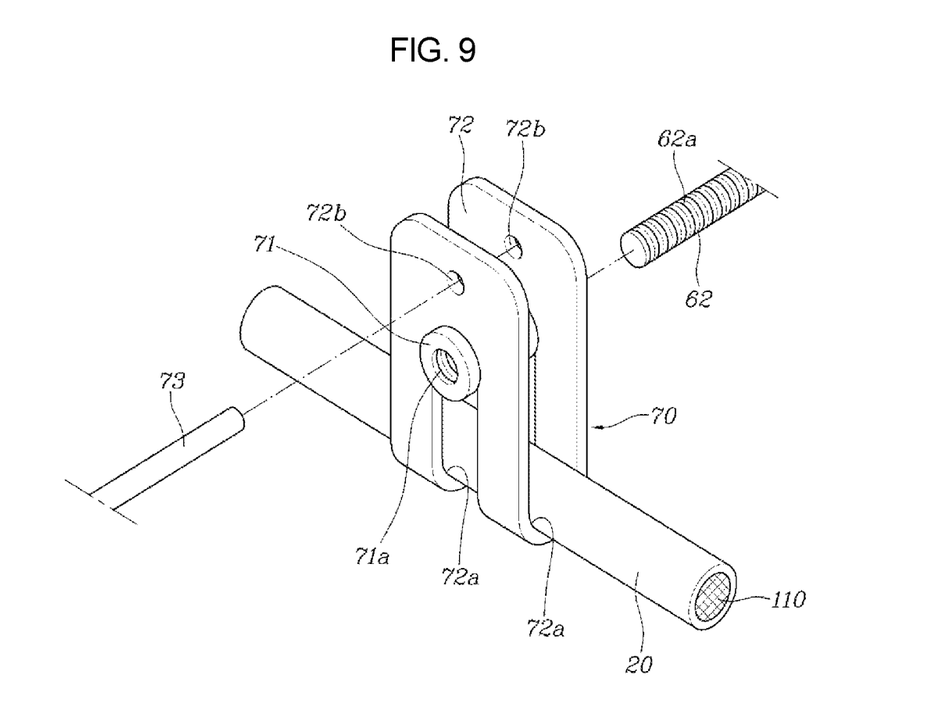
FIG. 9 is a diagram for explaining a connection mechanism according to an exemplary embodiment of the present invention.
Figure 10:
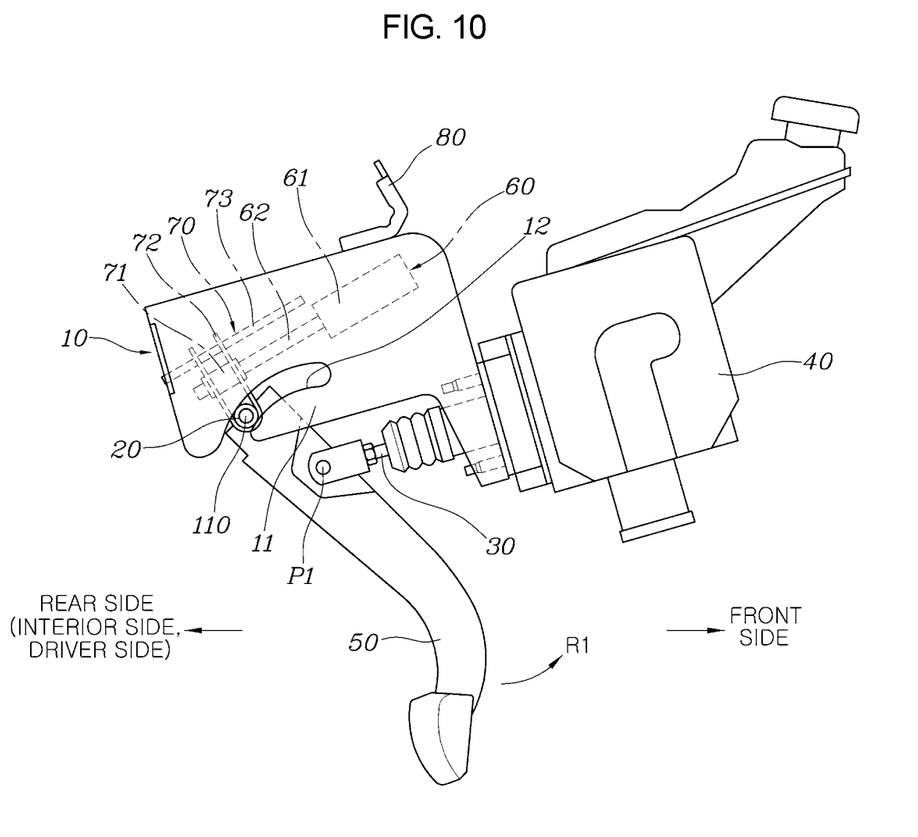
FIG. 10 is a diagram illustrating a state where the lower end portion of the brake pedal is hidden by rotating forward according to an exemplary embodiment of the present invention.

As illustrated in FIG. 3, when the actuator 60 is operated in a state where the pedal shaft 20 is positioned at the front end portion of the guide slot 12, the operating force of the actuator 60 is delivered to the pedal shaft 20 through the connection mechanism 70, the pedal shaft 20 slides from the position of the front end portion of the guide slot 12 toward the rear end portion thereof along the guide grooves 12, and the brake pedal 50 rotates around the connection point (P1) by the slide movement of the pedal shaft 20 such that the lower end portion of the brake pedal rotates to move forward (arrow R1), and as a result, the brake pedal 50 becomes the hidden state where the exposure to the interior of the vehicle is blocked, as illustrated in FIG. 10.

Conversely, as illustrated in FIG. 10, when the pedal shaft 20 slides toward the front end portion of the guide slot 12 along the guide slot 12 by the operation of the actuator 60 in a state where the pedal shaft 20 is positioned at the rear end portion of the guide slot 12, the brake pedal 50 rotates around the connection point (P1) by the slide movement of the pedal shaft 20 so that the lower end portion thereof moves backward toward the driver, and as a result, the brake pedal 50 becomes the exposed pop-up state illustrated in FIG. 3 again.

Furthermore, according to an exemplary embodiment of the present invention further includes a permanent magnet 110 (magnet) which is fixedly coupled to one end surface of the pedal shaft 20, and a contactless pedal sensor 120 which is fixed to the pedal member 10.

The contactless pedal sensor 120 is fixedly coupled to one side surface of the pedal member 10 by welding by use of a separate bracket.

The contactless pedal sensor 120 detects a rotation angle of the brake pedal 50 through a change in a magnetic field strength of the permanent magnet according to a change in a rotation position of the permanent magnet 110, only when the pedal shaft 20 rotates in a state where the permanent magnet 110 faces the contactless pedal sensor 120, and generates a signal related to braking.

The contactless pedal sensor 120 has a configuration having a Printed Circuit Board (PCB), and a configuration in which the permanent magnet 110 is coupled to one end surface of the pedal shaft 20 which is configured as the rotation center of the brake pedal 50, and as a result, there is an advantage in that it is possible to further enhance the accuracy of the output signal of the contactless pedal sensor 120.

As illustrated in FIG. 3, the permanent magnet 110 which is coupled to the pedal shaft 20 faces the contactless pedal sensor 120 only in the state where the pedal shaft 20 is positioned at the front end portions of the guide grooves 12.

Accordingly, as illustrated in FIG. 3, when the driver operates the brake pedal by depressing the brake pedal 50 with his or her foot in the state where the permanent magnet 110 and the contactless pedal sensor 120 face each other, the pedal shaft 20 rotates (axially rotates) within the guide slot 12, the brake pedal 50 is rotated, by the rotation of the pedal shaft 20, forward with respect to the pedal member 10, and the brake booster 40 is operated by a forward movement of the pedal push rod 30 when the brake pedal 50 rotates forward to generate the hydraulic pressure required for braking.

Furthermore, the contactless pedal sensor 120 detects the rotation angle of the brake pedal 50 through a change in a magnetic field strength of the permanent magnet according to a change in a rotation position of the permanent magnet 110 by the rotation of the pedal shaft 20, and generates a signal related to braking, such that the vehicle may normally perform the braking.

Furthermore, as illustrated in FIG. 3, when the pedal shaft 20 slides toward the rear end portions of the guide grooves 12 by the operation of the actuator 60 in the state where the pedal shaft 20 is positioned at the front end portions of the guide grooves 12, the brake pedal 50 rotates around the connection point (P1) so that the lower end portion of the brake pedal rotates to move forward, and as a result, the brake pedal 50 becomes the hidden state where the exposure to the interior of the vehicle is blocked, as illustrated in FIG. 10, and when the brake pedal 50 becomes the hidden state, the driver may have a comfortable rest in a relax mode as the space below the driver seat becomes a large space without interference of the pedal.

Figure 11:
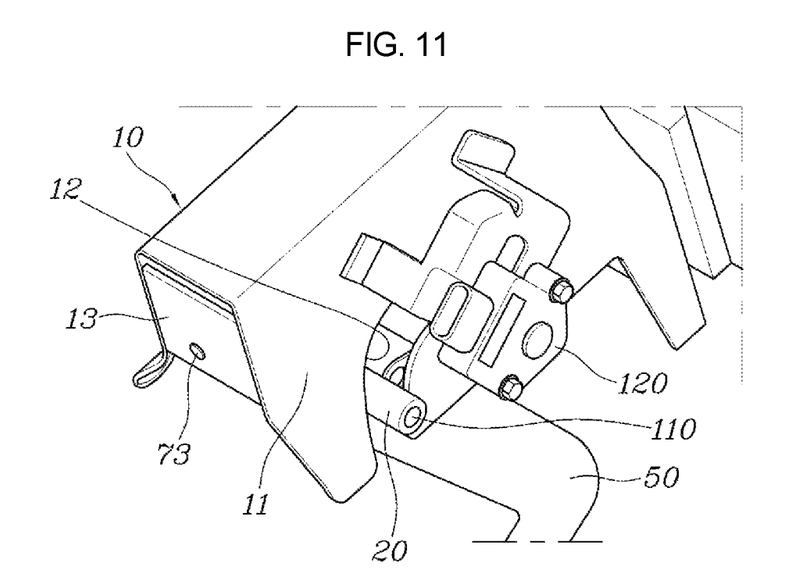
FIG. 11 is a diagram illustrating a permanent magnet and a contactless pedal sensor whose positions are changed when being in the state illustrated in FIG. 10.

When the pedal shaft 20 slides from positions of the front end portions of the guide grooves 12 toward the rear end portions thereof by the operation of the actuator 60, the permanent magnet 110 which is coupled to the pedal shaft 20 finishes facing the contactless pedal sensor 120, which is coupled to the pedal member 10, as illustrated in FIG. 11, and no signal related to braking is generated through the contactless pedal sensor 120 even if the brake pedal 50 is rotated as the driver depresses the brake pedal 50 with his or her foot in the state where the permanent magnet 110 and the contactless pedal sensor 120 finish facing each other. Therefore, there is an advantage in that it is also possible to prevent the situation where the driver erroneously operates the brake pedal 50 in the autonomous running situation.

The actuator 60 according to an exemplary embodiment of the present invention includes, for example, a motor 61, and a motor shaft 62 which has a thread 62a formed on the external circumferential surface thereof.

Furthermore, the connection mechanism 70 according to an exemplary embodiment of the present invention include a pipe nut 71 which has a thread 71a formed on the internal circumferential surface thereof to be screw-coupled to the motor shaft 62 while the motor shaft 62 is provided to penetrate the pipe nut 71, a band bracket 72 is formed so that a "U"-shaped groove portion 72a, which is coupled integrally to the pipe nut 71 and surrounds the pedal shaft 20 penetrating the "U"-shaped groove portion 72a in the left and right direction thereof, is positioned below the pipe nut 71, and a support pin 73 which is mounted to have one end portion fixed to a rear surface 13 of the pedal member 10 and have the other end portion penetrating the band bracket 72.

Accordingly, when the motor shaft 62 rotates by the operation of the motor 61, the pipe nut 71 linearly moves in a longitudinal direction of the motor shaft 62, and simultaneously, the band bracket 72 moves linearly in a longitudinal direction of the support pin 73, and the pedal shaft 20, which is provided to penetrate the "U"-shaped groove portion 72a of the band bracket 72 by the movement of the band bracket 72, slides along the guide grooves 12 which are formed on the pedal member 10.

The motor shaft 62 is configured as a conventional lead screw, and the pipe nut 71 is configured as a conventional nut which moves along the lead screw.

If necessary, instead of the motor 61, a linear motor, which is a linear type motor, may be provided, and in the instant case, the motor shaft 62 may be a linearly moving plunger (mover), and the pipe nut 72 simply becomes a structure coupled integrally to the linearly moving plunger (mover).

The band bracket 72 is formed with a pin hole 72b through which the support pin 73 is provided to penetrate so that the band bracket 72 may linearly move in a longitudinal direction of the support pin 73, and the other end portion of the support pin 73 is provided to penetrate the pin hole 72b.

According to an exemplary embodiment of the present invention, two "U"-shaped groove portions 72a of the band bracket 72 are formed to be spaced from each other in the left and right direction thereof, the pedal shaft 20 is mounted to simultaneously penetrate the two guide grooves 12 and the two "U"-shaped groove portions 72a which are formed on the left and right side surfaces 11 of the pedal member 10, respectively, and as a result, the pedal shaft 20 is supported by the two guide grooves 12 and the two "U"-shaped groove portions 72a and thus prevented from a distortion thereof in a longitudinal direction of the pedal shaft.

Furthermore, according to an exemplary embodiment of the present invention, the guide grooves 12 are formed to be cut in arc shapes along the rotation radius around the connection point (P1) between the brake pedal 50 and the pedal push rod 30 and the front end portions thereof are formed of the structure blocked by the pedal member 10. As a result, as illustrated in FIG. 3, when the pedal shaft 20 is positioned at the front end portions of the guide grooves 12, the pedal shaft 20 is supported by the guide grooves 12 and thus prevented from bending forward and upward while being supported by the "U"-shaped groove portions 72a and thus prevented from bending forward therefrom.

As described above, the brake pedal apparatus of an autonomous vehicle according to an exemplary embodiment of the present invention has a configuration in which the lower end portion of the brake pedal 50 is popped-up to be exposed to the interior of the vehicle so that the driver may operate the brake pedal 50 in the manual driving mode situation for the driver to drive the vehicle directly, and the brake pedal becomes the hidden state so that the driver may not operate the brake pedal as the lower end portion of the brake pedal 50 is rotated to move forward by the operation of the actuator 60 in the autonomous running mode situation in which the driver does not drive directly the vehicle, and may enable the comfortable rest of the driver in the autonomous running situation, and block the erroneous operation of the brake pedal 50 in the autonomous running situation, advantageously improving the safety.

In an exemplary embodiment of the present invention, a controller is connected to at least one of the elements such as the contactless pedal sensor 120, the actuator 60, the brake booster 40 in the brake pedal apparatus, to control the operations thereof.

In addition, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A brake pedal apparatus for a vehicle, the brake pedal apparatus comprising:
   a pedal member which is fixedly installed in a space below a front side of a driver seat and has at least a guide groove formed on at least a side surface of the pedal member;
   a pedal shaft which is mounted to penetrate the at least a side surface of the pedal member through the at least a guide groove and configured to move along the at least a guide groove;
   a brake pedal wherein an upper end portion of the brake pedal is rotatably coupled to the pedal shaft and a portion of the brake pedal is connected to a brake booster with a pedal push rod;
   an actuator which is fixed to the pedal member;
   a connection mechanism which connects the actuator with the pedal shaft to deliver a power of the actuator to the pedal shaft so that the pedal shaft moves along the at least a guide groove when the actuator is operated;
   a permanent magnet which is fixedly coupled to an end surface of the pedal shaft; and
   a pedal sensor which is mounted to the pedal member,
   wherein the pedal sensor detects a rotation angle of the brake pedal through a change in a magnetic field strength of the permanent magnet according to a change in a rotation position of the permanent magnet, when the pedal shaft rotates to be in a state where the permanent magnet faces the pedal sensor, and generates a signal related to braking.

2. The brake pedal apparatus of the vehicle according to claim 1,
   wherein the at least a guide groove is formed to be cut in a curved shape along a rotation radius of the pedal shaft around a connection point in which the brake pedal and the pedal push rod are coupled.

3. The brake pedal apparatus of the vehicle according to claim 2,
   wherein the at least a guide groove has a front end portion blocked by the pedal member, and a rear end portion formed to be open downwardly from the pedal member.

4. The brake pedal apparatus of the vehicle according to claim 1,
   wherein the pedal shaft rotates within the at least a guide groove when the brake pedal is operated,
   wherein the brake pedal rotates forward with respect to the pedal member by a rotation of the pedal shaft, and
   wherein the brake booster is operated by a forward movement of the pedal push rod when the brake pedal rotates forward therefrom.

5. The brake pedal apparatus of the vehicle according to claim 1,
wherein the at least a guide groove is formed to be cut in in a curved shape along a rotation radius of the pedal shaft around a connection point in which the brake pedal and the pedal push rod are coupled,
wherein the pedal shaft is configured to be slidably moved along the at least a guide groove by receiving an operating force of the actuator through the connection mechanism,
wherein the brake pedal is in a hidden state where the brake pedal is blocked from being exposed to an interior of the vehicle as the brake pedal rotates around the connection point and a lower end portion of the brake pedal rotates to move forward when the pedal shaft slides from a front end portion of the at least a guide groove toward a rear end portion of the at least a guide groove, and
wherein the brake pedal is in a pop-up state where the brake pedal is exposed to the interior of the vehicle as the brake pedal rotates around the connection point so that the lower end portion of the brake pedal rotates to move backward, when the pedal shaft slides from the rear end portion of the at least a guide groove toward the front end portion of the at least a guide groove.

6. The brake pedal apparatus of the vehicle according to claim 1, further including an elastic member which is mounted to connect the pedal member with the brake pedal, accumulates an elastic force while being increased in length thereof when the brake pedal rotates forward as the brake pedal is operated, and returns to an original length thereof by rotating the brake pedal backward by the accumulated elastic force when the brake pedal is released.

7. The brake pedal apparatus of the vehicle according to claim 1,
wherein the at least a guide groove is formed to be cut in a curved shape along a rotation radius of the pedal shaft around a connection point in which the brake pedal and the pedal push rod are coupled,
wherein the permanent magnet which is coupled to the pedal shaft faces the pedal sensor to be in a state where the pedal shaft is positioned at a front end portion of the at least a guide groove, and
wherein the pedal sensor generates the signal related to the braking when the brake pedal rotates to be in a state where the permanent magnet and the pedal sensor surface each other.

8. The brake pedal apparatus of the vehicle according to claim 1,
wherein the at least a guide groove is formed to be cut in a curved shape along a rotation radius of the pedal shaft around a connection point in which the brake pedal and the pedal push rod are coupled,
wherein the permanent magnet coupled to the pedal shaft finishes facing the pedal sensor when the pedal shaft slides from the front end portion of the at least a guide groove toward the rear end portion of the at least a guide groove by operation of the actuator, and
wherein the pedal sensor generates no signal related to the braking, when the brake pedal rotates to be in a state where the permanent magnet and the pedal sensor finish facing each other.

9. The brake pedal apparatus of the vehicle according to claim 1,
wherein the actuator includes a motor and a motor shaft which is coupled to the motor and has a thread formed on an external circumferential surface of the motor shaft,
wherein the connection mechanism includes:
a pipe nut which has a thread formed on an internal circumferential surface of the pipe nut to be screw-coupled to the motor shaft while the motor shaft is provided to penetrate the pipe nut;
a band bracket, a lower portion which is formed to include a "U"-shaped groove portion which is coupled integrally to the pipe nut, surrounds the pedal shaft penetrating the "U"-shaped groove portion, and is positioned below the pipe nut; and
a support pin which is fixed to a rear surface of the pedal member and is mounted to penetrate an upper portion of the band bracket, and
wherein the pipe nut moves linearly in a longitudinal direction of the motor shaft when the motor shaft rotates, and the band bracket moves linearly in a longitudinal direction of the support pin.

10. The brake pedal apparatus of the vehicle according to claim 9,
wherein the U"-shaped groove portion is formed to include two "U"-shaped groove portions of the band bracket which are positioned to be spaced from each other in a width direction of the pedal member, and
wherein the at least a guide groove is formed in plural to include two guide grooves which are formed on a first side surface and a second side surface of the pedal member, respectively, so that the pedal shaft is supported by the two guide grooves and the two "U"-shaped groove portions to be prevented from distortion in a longitudinal direction of the pedal shaft.

11. The brake pedal apparatus of the vehicle according to claim 9,
wherein the at least a guide groove is formed to be cut in a curved shape along a rotation radius of the pedal shaft around a connection point in which the brake pedal and the pedal push rod are coupled and a front end portion of the at least a guide groove is formed to be blocked by the pedal member, and
wherein, when the pedal shaft is positioned at the front end portion of the at least a guide groove, the pedal shaft is supported by the "U"-shaped groove portion to be prevented from bending forward, and is supported by the at least a guide groove to be prevented from bending forwards and upwards.

12. A brake pedal apparatus of a vehicle, the apparatus comprising:
a pedal member including guide grooves having a curved shape which are cut to extend along a longitudinal direction of the pedal member are formed on first and second side surfaces of the pedal member,
a pedal shaft, which is provided to penetrate the guide grooves and is coupled to an upper end portion of a brake pedal,
wherein, when the pedal shaft is positioned at a front end portion of the guide grooves, the brake pedal rotates around a connection point in which a brake booster is connected with the brake pedal so that a lower end portion of the brake pedal is popped-up to be exposed to an interior of the vehicle, and
wherein, when the pedal shaft moves from the front end portion of the guide grooves toward a rear end portion of the guide grooves, as the brake pedal rotates around the connection point and the lower end portion of the brake pedal moves forward so that the lower end portion of the brake pedal moves forward, the lower end portion of the brake pedal is in a hidden state where the brake pedal is not exposed to the interior of the vehicle.

13. The brake pedal apparatus of claim 12, further including:
a brake pedal, wherein an upper end portion of the brake pedal is rotatably coupled to the pedal shaft, and a portion of the brake pedal is connected to a brake booster with a pedal push rod;
an actuator which is fixed to the pedal member; and
a connection mechanism which connects the actuator with the pedal shaft to deliver a power of the actuator to the pedal shaft so that the pedal shaft moves along the guide grooves when the actuator is operated.

14. The brake pedal apparatus of the vehicle according to claim 12,
wherein each of the guide grooves are formed to be cut in a curved shape along a rotation radius of the pedal shaft around a connection point in which the brake pedal and the pedal push rod are coupled, and has a front end portion blocked by the pedal member, and a rear end portion formed to be open downwardly from the pedal member.

15. The brake pedal apparatus of the vehicle according to claim 12, further including an elastic member which is mounted to connect the pedal member with the brake pedal, accumulates an elastic force while being increased in length thereof when the brake pedal rotates forward as the brake pedal is operated, and returns to an original length thereof by rotating the brake pedal backward by the accumulated elastic force when the brake pedal is released.

16. The brake pedal apparatus of the vehicle according to claim 12, further including:
a permanent magnet which is fixedly coupled to an end surface of the pedal shaft; and
a pedal sensor which is mounted to the pedal member,
wherein the pedal sensor detects a rotation angle of the brake pedal through a change in a magnetic field strength of the permanent magnet according to a change in a rotation position of the permanent magnet, when the pedal shaft rotates to be in a state where the permanent magnet faces the pedal sensor, and generates a signal related to braking.

17. The brake pedal apparatus of the vehicle according to claim 13,
wherein the actuator includes a motor and a motor shaft which is coupled to the motor and has a thread formed on an external circumferential surface of the motor shaft,
wherein the connection mechanism includes:
a pipe nut which has a thread formed on an internal circumferential surface of the pipe nut to be screw-coupled to the motor shaft while the motor shaft is provided to penetrate the pipe nut;
a band bracket, wherein a lower portion of the band bracket includes a "U"-shaped groove portion, which is coupled integrally to the pipe nut and surrounds the pedal shaft penetrating the "U"-shaped groove portion in a width direction of the pedal member, and is positioned below the pipe nut; and
a support pin which is fixed to a rear surface of the pedal member and is mounted to penetrate the band bracket, and
wherein the pipe nut moves linearly in a longitudinal direction of the motor shaft when the motor shaft rotates, and the band bracket moves linearly in a longitudinal direction of the support pin.

18. The brake pedal apparatus of the vehicle according to claim 12,
wherein two "U"-shaped groove portions of the band bracket are formed to be spaced from each other in a width direction of the pedal member, and
wherein the pedal shaft is mounted to penetrate the guide grooves and the two "U"-shaped groove portions, so that the pedal shaft is supported by the guide grooves and the two "U"-shaped groove portions to be prevented from a distortion thereof in a longitudinal direction of the pedal shaft.

* * * * *